United States Patent [19]

Rickard

[11] 4,397,101

[45] Aug. 9, 1983

[54] AUTOMATIC DRYER CONTROL

[75] Inventor: Jimmy R. Rickard, Louisville, Ky.

[73] Assignee: General Electric Company, Louisville, Ky.

[21] Appl. No.: 300,772

[22] Filed: Sep. 10, 1981

[51] Int. Cl.³ .............................................. F26B 21/10
[52] U.S. Cl. .......................................... 34/30; 34/48; 34/53; 34/55
[58] Field of Search .................... 34/30, 46, 48, 53, 55

[56] References Cited

U.S. PATENT DOCUMENTS

| | | | |
|---|---|---|---|
| 3,699,665 | 10/1972 | Shinskey | 34/48 |
| 4,019,259 | 4/1977 | Veraart | 34/48 |
| 4,112,589 | 9/1978 | Palfrey et al. | 34/48 |
| 4,206,552 | 6/1980 | Pomerantz et al. | 34/23 |
| 4,209,915 | 7/1980 | Keuleman et al. | 34/48 |
| 4,231,166 | 11/1980 | McMillan | 34/48 |
| 4,267,643 | 5/1981 | Haried | 34/48 |
| 4,286,391 | 9/1981 | Gerry | 34/44 |

FOREIGN PATENT DOCUMENTS

1521532 8/1978 United Kingdom .

Primary Examiner—Larry I. Schwartz
Attorney, Agent, or Firm—H. Neil Houser; Radford M. Reams

[57] ABSTRACT

A microcontroller based control system for an automatic clothes dryer of the type having dry cycle time-drum outlet air temperature function which reflects an initial warm up period of relatively rapidly rising temperature; followed by a period in which the outlet air temperature remains relatively constant at the plateau temperature; followed by a period of relatively rapidly increasing outlet air temperature. The control system maintains a substantially constant drum inlet air temperature and senses outlet air temperature, initiating termination of the dry cycle as a function of the integral of dry cycle time as a function of outlet air temperature. In a preferred form, the control system computes a first integral value corresponding to the integral of dry cycle time over outlet air temperatures ranging from the initial temperature to the plateau temperature and a second integral value corresponding to the integral over the range from the plateau temperature to the last recorded incremental increase in temperature. Termination of the dry cycle is initiated when the ratio of the second integral value to the first integral value at least equals a reference value which corresponds to the dryness level selected by the user.

11 Claims, 5 Drawing Figures

AUTOMATIC DRYER CONTROL

BACKGROUND OF THE INVENTION

This invention relates to automatic clothes dryers and more specifically to control systems therefor designed to initiate termination of the dry cycle when the percentage of moisture retained in the clothes load has declined to a level of dryness desired by the user.

It has been common practice to provide automatic clothes dryers with an electromechanical timer which the user manipulates to set the drying time at a value expected to be adequate for drying the clothing load. Although the timer dial is generally provided with markings to assist the user in selecting the proper amount of drying time, the user typically must estimate, based on experience, the amount of time needed to dry a particular load. Such estimating generally results in clothes being over dried which results in excess energy consumption and possible damage to the clothing, or under-drying, in which case the dryer is cycled on and off by the user with the load being inspected after each drying period to determine when the load is sufficiently dry.

In an effort to overcome the shortcomings of straight time setting, it has become common practice to provide for a certain degree of automatic control based upon load dryness. One such approach employs an interdigitized resistance member positioned so as to intermittently be contacted by the clothes as they tumble. The resistance member is coupled to a capacitor, which is charged by the control circuit at a certain rate and is discharged through the resistance member at a rate determined by the degree of dryness of the clothes contacting the member. When the capacitor becomes charged to a certain level, a timer which is set by the user is activated. The dry cycle is terminated when the timer times out. When very wet, the clothes present a relatively low resistance rapidly discharging the capacitor. As the clothes become drier, contact by the clothes discharges the capacitor at a decreasing rate. Thus, the timer is cycled intermittently as a function of the dryness of the clothes. As the clothes become dryer, the ON time of the timer increases until the timer times out ending the cycle.

Another approach involves monitoring outlet air temperature from the drum and energizing a timer when the sensed temperature reaches a predetermined level. Both of these approaches still requires the user to make some estimate of load size.

Yet another approach which purports to eliminate the need for estimating load size is taught by U.S. Pat. No. 4,109,259 which employs a thermostatic switch responsive to the cooling effect of the clothing load. The duty cycle of the switch is varied to provide a shorter dryer time for small loads than for larger loads. Electromechanical arrangements of this type are subject to long term reliability problems associated with repeated operation. Accuracy of control can also be a problem dependent upon the closeness with which the thermostatic switches can be manufactured to design specifications.

Commonly assigned U.S. Pat. No. 4,286,391 discloses a microprocessor based control system which senses outlet air temperature and advantageously uses the fact that for a constant inlet air temperature the outlet air temperature is substantially constant over a major portion of the dry cycle at an absolute value dependent upon the size of the clothes load and which rises near the end of the cycle. The microprocessor is programmed to detect the constant temperature and initiate termination of the dry cycle when the sensed temperature exceeds the constant temperature by a predetermined percent of the constant temperature. The percentage corresponding to the user selected dryness level. While this approach overcomes problems associated with the electromechanical systems mentioned hereinbefore, it employs absolute temperature measurement. For satisfactory operation, relatively high accuracy temperature sensing components are needed. Components providing such accuracy capability are costly.

It is therefore an object of this invention to provide a control system which obviates the problems associated with electromechanical controls and which does not require costly high accuracy temperature sensing components.

It is a further object of the invention to provide a dryer control system which initiates termination of the dry cycle based upon relative measurements rather than absolute measurements.

SUMMARY OF THE INVENTION

In accordance with the invention, there is provided a control system for an automatic clothes dryer of the type having a clothes drying drum, an air flow system for passing drying air through the drum, a heater for heating the air at the inlet side of the drum, and selection means enabling the user to select a particular dryness level. The heated portion of the drying cycle for the clothes dryer essentially comprises three phases or periods: an initial warm up period characterized by a relatively rapidly increasing drum outlet air temperature; followed by a period of relatively constant moisture removal characterized by a relatively constant drum outlet air plateau temperature; followed by a period of decreasing moisture removal characterized by a relatively rapidly increasing outlet air temperature. The outlet air temperature for the dryer thus has a characteristic time-temperature function which reflects these periods.

The control system of the invention uses the integral of dry cycle time as a function of outlet air temperature to determine when the clothes in the drum have been dried to the desired predetermined percentage dryness level. To this end, in accordance with a broad aspect of the invention, the control system comprises inlet air temperature sensing means for sensing the temperature of air entering the drum; outlet air temperature sensing means for sensing the temperature of air leaving the drum; control means preferably in the form of a microcontroller which is preprogrammed to provide means responsive to the inlet air temperature sensing means for controlling energization of the heater to maintain a substantially constant predetermined inlet air temperature; clock means for timing the drying cycle; means responsive to the outlet air temperature sensing means and the clock means for computing an end point value which is a function of the integral of the dry cycle time as a function of outlet air temperature; and means for initiating termination of the dry cycle when a predetermined relationship exists between the end point value and a reference value corresponding to the dryness level selected by the user.

In accordance with one form of the invention, the means for computing the end point value computes a first value corresponding to the integral of dry cycle time over the outlet air temperature range from the initial temperature to the plateau temperature and thereafter repeatedly computes a second value corresponding to the integral of dry cycle time versus outlet air temperature over the temperature range from the plateau temperature to the end point temperature and computes the ratio of the second value to the first value. The means for initiating termination of the dry cycle compares this ratio to a predetermined reference corresponding to the dryness level selected by the user and initiates termination of the dry cycle when the ratio at least equals the reference.

DETAILED DESCRIPTION OF THE INVENTION

Figures 1, 2, 3:
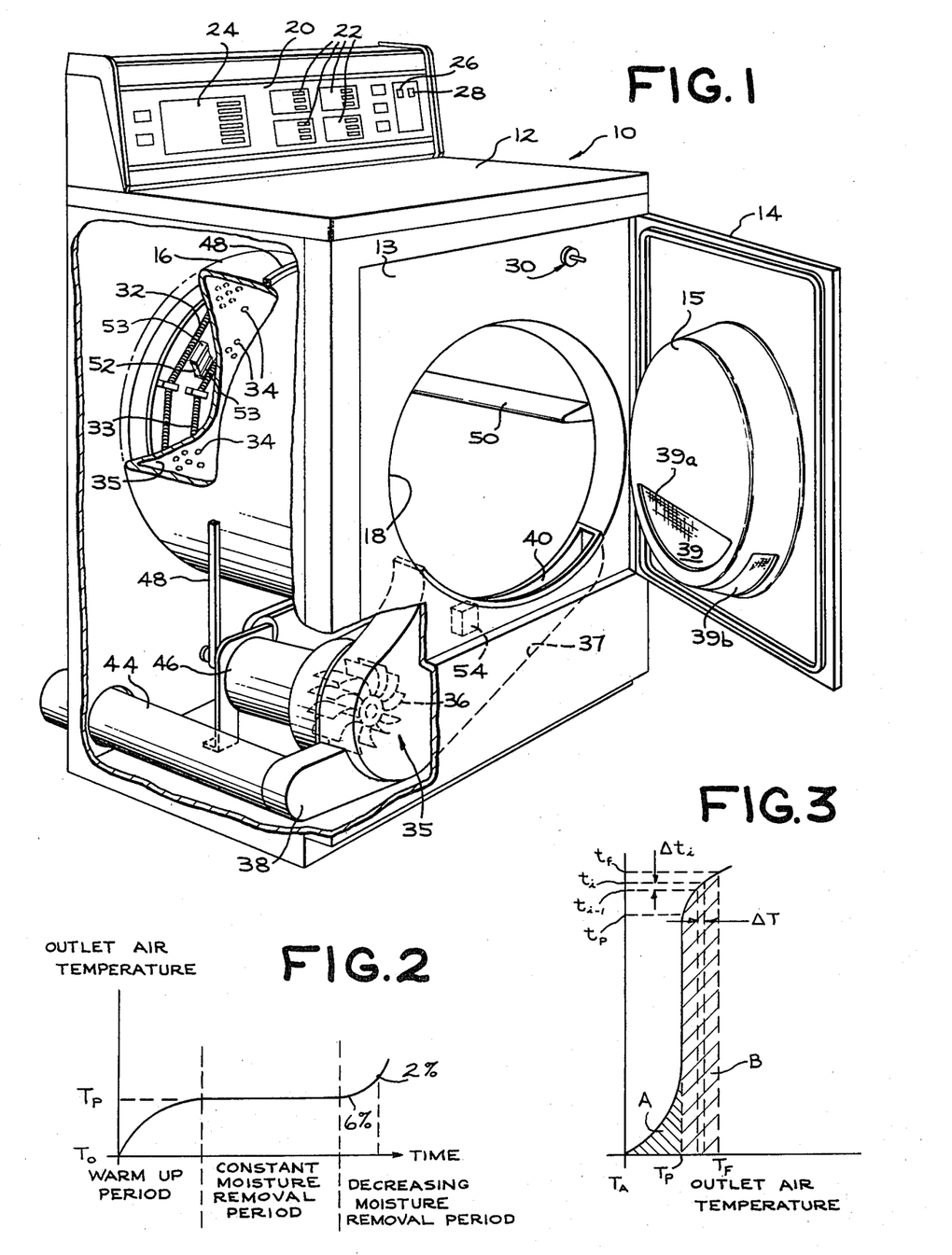
FIG. 1 is a simplified perspective view, partially cut away, of a dryer illustrating various constructional details thereof and incorporating an illustrative embodiment of the control system of the present invention.
FIG. 2 is a graph representing the variation temperature of air leaving the drum with time during the drying cycle for the dryer of FIG. 1.
FIG. 3 is the graph of FIG. 2 with axes reversed to show dry cycle time as a function of outlet air temperature.

Referring now to FIG. 1, there is illustrated a clothes dryer 10 including an appearance and protective outer cabinet 12 having an access door 14 which is hingedly secured to the front wall 13 of cabinet 12. Within cabinet 12, there is provided a clothes tumbling container or drum 16 mounted for rotation about a horizontal central axis. Clothing articles to be dried are placed in the interior drum 16 through access opening 18. Door 14 covers the access opening and seals it when the machine is being operated. Door 14 includes a raised cylindrical portion 15 which plugs access opening 18 when door 14 is closed, preventing clothes from becoming entangled on the side wall of the opening 18 when tumbling in drum 16.

Control panel 20 includes a plurality of indicator lights 22 for displaying cycle selection and progress and a cycle selection keyboard 24 which enables the user to select desired dry cycle options from a plurality of dry cycle option selections. Manual On and Off buttons 26 and 28, respectively, are also provided which enable the user to manually start and stop appliance operation. The dryer also has a normally open door switch assembly 30 secured to cabinet side wall 13 and associated with door 14 such that the appliance only operates when the access door 14 is closed.

A pair of electric heating elements 32 and 33 provide a source of heated air which is drawn in from the rear of the cabinet 12 into the interior of drum 16 through openings 34 formed in the rear wall of drum 14. The heated air is drawn in by means of a blower arrangement 35 including blades 36, inlet duct 37 and outlet duct 38. Blower inlet duct 37 communicates with drum 16 through a filter chamber 39 in cylindrical portion 15 of door 14 which is a hollow chamber between filter inlet opening 39a facing drum 16 and filter outlet opening 39b in the side wall of portion 15. Filter outlet opening 39b conforms to inlet opening 40 of the blower inlet duct, and is aligned with blower inlet opening 40 when door 14 is closed. Filter inlet opening 39a covered with a relatively coarse mesh screen for preventing clothing articles and large foreign materials from entering the filter chamber. Filter outlet opening 39b is covered with a filter screen of fine nylon mesh for removing lint particles from the air as the air exits the filter chamber. Air is drawn from drum 16 into the vicinity of blower blades 36 via filter chamber 39 and inlet opening 40 and inlet duct 37 and exhausted through outlet duct 38 and exhaust duct 44 which may be coupled to an external exhaust vent. Blower blades 36 are driven by electric motor 46.

Drum 16 is rotated by means of a drive belt 48 extending about the exterior of drum 16 which is also driven by electric motor 46. Vanes 50 are provided in the interior of drum 16 to cause proper tumbling of the clothing articles within the interior of drum 16 in a conventional manner. Thus, the clothing articles placed within drum 16 are dried by a combination of air flow heat supplied by the heating elements 32 and 33 and tumbling action provided by the rotation of drum 16.

Suitable inlet air temperature sensing means, such as thermistor 52, is secured to the rear wall of cabinet 12 between heater elements 32 and 33 to sense the temperature of the heated inlet air entering the drum through rear drum wall openings 34. Thermistor 52 must be shielded from the radiant energy generated by heater elements 32 and 33 by suitable means, such as heat shielding walls 53 interposed between thermistor 52 and elements 32 and 33. Suitable outlet air temperature sensing means, such as thermistor 54, is secured to an inner wall of inlet duct 37 near inlet opening 40, to sense the temperature of the outlet air being drawn from the drum 16.

The operation of dryer 10 is generally as follows: clothes are placed in the drum by opening door 14 and passing them through access opening 18 into the interior of drum 16. When door 14 is closed, door switch 30 is closed, enabling energization of motor 46 and heating elements 32 and 33. The user may then select either a predetermined drying time or may select from a plurality of desired dryness levels by actuating appropriate ones of keyboard switches 24. Once the desired cycle options have been selected, the user starts the cycle by actuating ON switch 26. The control system then causes the motor 46 to be energized causing blower 36 and drum 16 to begin rotation. Air in the vicinity of the rear of the cabinet outside drum 16 is heated as it passes over heater elements 32 and 33 prior to entering drum 16. The heated inlet air enters the drum through openings 34, passes through the drum 16 and is drawn from drum 16 through filter chamber 39 in door 14 and inlet duct 37 where it passes over thermistor 54 before exiting the machine through outlet duct 38 and exhaust outlet 44.

As is well known in the art, when the inlet air temperature is maintained at a substantially constant level, the variation in outlet air temperature as the dry cycle progresses may be characterized by the temperature vs. time graph shown in FIG. 2. During the initial warm-up period, heat supplied to the inlet air entering the drum is taken mostly to raise the temperature of the drum and the wet clothes contained therein. During this period, the rate at which moisture is removed from the clothes increases until a point of stability is reached at which, for a given heat input rate, the rate of moisture removal remains fairly constant. This point of stability begins the period of a dry cycle which may be characterized by a relatively constant outlet air temperature designated the plateau temperature $T_p$. For clothes loads in the 2–12 lb. range, and an inlet air temperature on the order of 250°, this temperature is typically in the 100°–150° range. Eventually, as the drying cycle progresses, the moisture content of the clothes load declines to the point at which the vaporization rate or moisture removal rate is insufficient to absorb the heat at the established rate of heat input. This is the period of decreasing moisture removal which may be characterized by a relatively rapidly increasing outlet air temperature. Generally, the temperature curve begins to rise when the moisture retention level for the clothes load is in the 15–20% range. For domestic clothes dryers, it is desirable to terminate the dry cycle in the six percent to two percent moisture retention range for the clothes load. The six percent retention level limit provides a moist load for ironing and the two percent limit provides an essentially "bone-dry" load.

It is desirable to provide a control system which allows the user to select from various predetermined dryness levels in this range. However, while the general relationship between outlet temperature and time illustrated in FIG. 3 is well known, use of the relationship to control termination of the dry cycle has been difficult to effectively implement because of the need for components which can accurately differentiate small changes in the large temperature numbers. Typically, a change of one to three percent must be detected, and the cost for components capable of detecting such changes has been prohibitive.

In accordance with the present invention, this difficulty is overcome by a control system which uses the integral of time versus temperature to determine the proper termination point in the dry cycle. In this way the small differences in temperature are multiplied by relatively large time values which exist near the end of the cycle, thereby magnifying the differences to be detected. The detection requirement may be further eased by use of a relative comparison rather than absolute values to terminate the cycle at the desired dryness level.

FIG. 3 illustrates the outlet air temperature function of FIG. 2 with time as a function of temperature. The area designated A corresponds to the value of the integral of the time function over the range of temperature from initial temperature $T_A$ to the plateau temperature $T_p$. The area designated B corresponds to the integral of the time function from plateau temperature $T_p$ to the final or end point temperature $T_f$. The final temperature, $T_f$, is the temperature at which the control system initiates termination of the dry cycle. It has been empirically determined that the general curves of FIG. 2 and 3 are essentially the same shape for all normal dryer loads with the ratio of area B (FIG. 3) to area A being essentially constant. Thus, relative measurements can be used to accurately detect the dry cycle end point. A plurality of predetermined ratios each corresponding to particular percentage dryness level in the two percent to six percent range can be empirically determined for a particular dryer model and fabric type, i.e. cotton, synthetic, etc., and used as reference values for that model and fabric type, with one such ratio being associated with each percentage dryness level option and fabric type option available for user selection. This would enable the user to merely select the fabric type and percentage dryness level desired from a plurality of available selections, and the control system can then automatically terminate the dry cycle at the appropriate time regardless of load size.

In accordance with the invention, the control system comprises inlet air temperature sensing means for sensing the temperature of air entering the drum; outlet air temperature sensing means for sensing the temperature of air leaving the drum; and control means for directing the functional operation of the various appliance operating components. The control means in accordance with a broader aspect of the present invention includes means responsive to the inlet air temperature sensing means for controlling the inlet air temperature to provide a substantially constant inlet air temperature; clock means for timing the drying cycle; means responsive to the outlet air temperature sensing means and the clock means for computing a dry cycle end point value which is a function of the integral of the dry cycle time over a range of outlet air temperatures; and means for initiating termination of the dry cycle when a predetermined relationship exists between the end point value and a predetermined reference value corresponding to the dryness level selected by the user. In a preferred form of the invention, the means for computing the end point value includes means for computing a first value corresponding to the integral of the dry cycle time versus drum outlet air temperature over a first range of outlet air temperatures, preferably the range from the initial temperature to the plateau temperature, computing a second value corresponding to the same integral over a second range of outlet air temperatures, preferably from the plateau temperature to the last sensed temperature and computing the end point value by computing the ratio of the second value to the first value. Means for initiating termination of the dry cycle compares this ratio to a predetermined reference value corresponding to the dryness level selected by the user and initiates termination of the dry cycle when the ratio at least equals the reference value.

Figure 4:
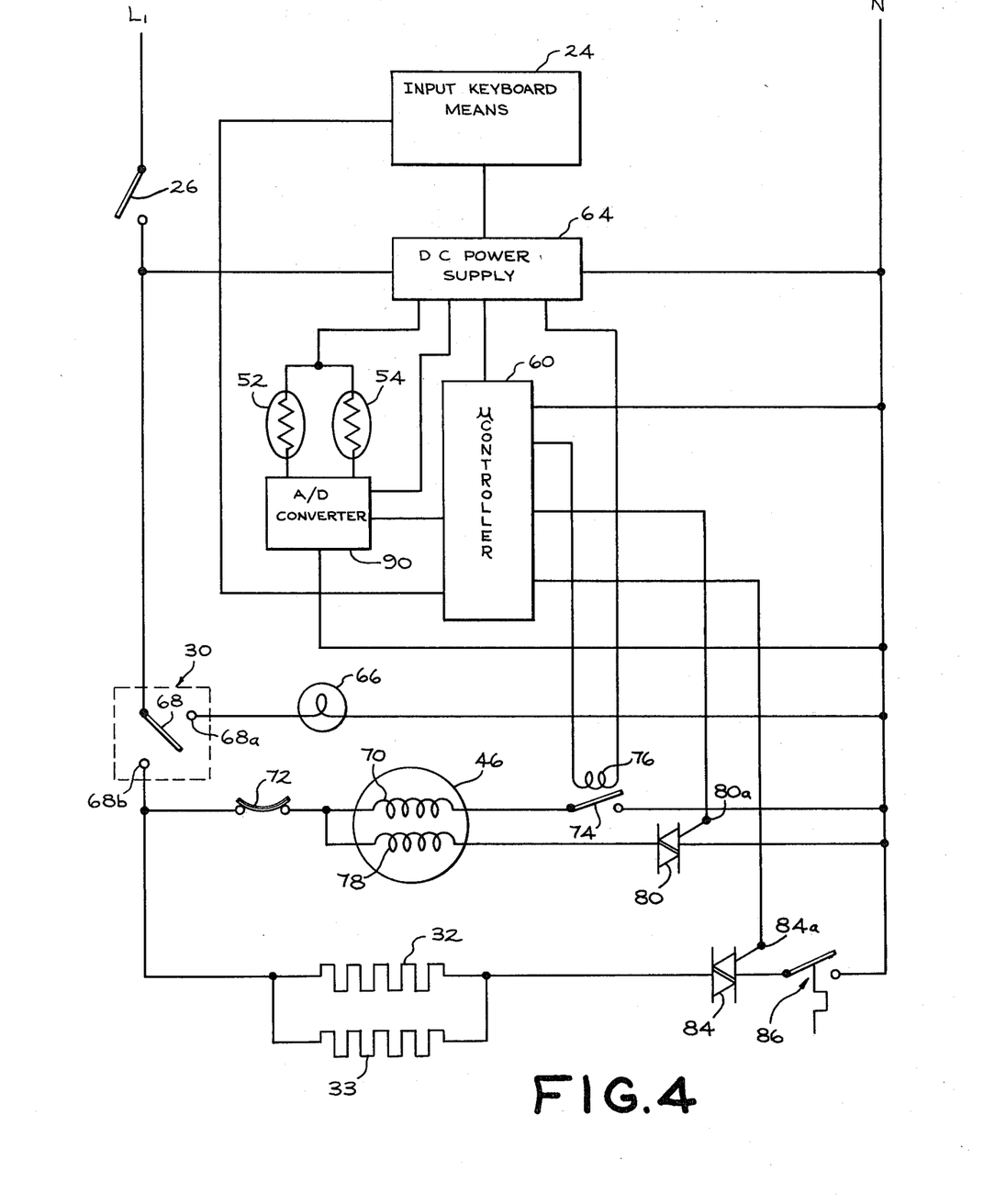
FIG. 4 is a partly block diagram and partly schematic representation of the control system of the dryer of FIG. 1.

Referring now to FIG. 4, a clothes dryer control system embodying the present invention is shown in which the control means comprises a pre-programmed microcontroller 60. Microcontroller 60 may be a readily commercially available, single chip CMOS type microcontroller available from National Semiconductor Corporation, identified by the type number COP 420. This device is described in detail in National Semiconductor publication entitled, "COP420C/COP 421C and COP320C/COP321C Single Chip CMOS Microcontrollers," copyright April 1980, which is hereby incorporated by reference.

Power is provided to the control system through conductors L1 and N which are adapted for connection to a 120 volt 60 Hz standard domestic power supply. User actuated ON/OFF switch 26 is serially connected in conductor L1. A conventional low voltage dc power supply circuit 64 is connected across conductors L1 and N to convert ac power from L1 and N to low voltage dc power for use by controller 60 and the other circuit components requiring dc power supply. Drum light 66 is connected across conductors L1 and N via door switch assembly 30. Door switch assembly 30 comprises a two-position switch 68 actuated by appliance door 14. When door 14 is open, door switch 68 is closed to terminal 68a, thereby energizing drum light 66. When door 14 is closed, switch 68 is closed to terminal 68b, thereby coupling the windings of motor 46 and parallel heater elements 32 and 33 to conductor L1. Run winding 70 of motor 46 is connected across conductor L1 and N through door switch 68, overload protector element 72 and relay switch 74. Relay coil 76 of switch 74 is selectively energized by microcontroller 60 which internally completes the circuit coupling coil 76 to dc power supply 64 through an input/output port of microcontroller 60. Start winding 78 is connected across conductors L1 and N through door switch 68, overload protection element 72 and triac 80. A control signal from controller 60 is applied to the gate terminal 80a of triac 80 to control energization of start winding 78. Resistive heating elements 32 and 33 are connected in parallel with each other across conductors L1 and N via door switch 68, triac 84 and high limit switch 86. Energization of heater elements 32 and 33 is controlled by gating signals applied to gate terminal 84a of triac 84 from microcontroller 60. User cycle selection information, such as fabric type and dryness level, is provided to controller 60 via input keyboard means energized by dc power supply 64.

The inlet and outlet temperature sensing means comprise conventional thermistors 52 and 54, respectively. Each of thermistors 52 and 54 are connected at one end thereof to power supply 64, the other end being connected to input terminals of A/D converter 90 which converts the analog voltage signals representing the temperature sensed by thermistors 52 and 54 to the proper digital format for input to microcontroller 60. DC bias voltages for proper operation of A/D converter 90 are derived from power supply 64. A/D converter 90 may be an integrated circuit manufactured by National Semiconductor, readily commercially available by type number COP430. Input of the inlet and outlet temperature data from thermistors 52 and 54 to microcontroller 60 via A/D converter 90 is initiated at appropriate times by controller 60 which sends a synchronizing signal to converter 90 and a serial bit stream designating which thermistor is to be sampled. In response, converter 90 provides an output signal in serial bit stream format representating the temperature presently sensed by the designated thermistor.

The inlet air temperature control means includes an appropriate pre-programmed portion of controller 60, responsive to the temperature signal from thermistor 52 and triac 84. Triac 84 controls the duty cycle of heater elements 32 and 33 in response to trigger signals from controller 60. Controller 60 triggers triac 84 into conduction in accordance with the inlet air temperature sensed by thermistor 52 to maintain the inlet air temperature at substantially a constant predetermined level typically in the 250° to 300° F. range. The clock means comprises an appropriate preprogrammed portion of microcontroller 60 which functions as a real time clock. The actual programming to implement the clock may be achieved in numerous ways well known to those skilled in the art of microcomputer programming and the details of implementing the clock are not part of the invention. Means for computing the end point value includes a preprogrammed portion of microcontroller 60 which processes temperature and time information received from the outlet air temperature sensing thermistor 54 via A/D converter 90 and the internal clock, respectively, to compute the integral of the function defined by this time and temperature information over the first and second temperature ranges. The means for computing the integral values, the means for computing the ratio of integral values, and the means for comparing the ratio to a predetermined reference and initiating termination of the dry cycle when the predetermined relationship is found to exist, each include portions of microcontroller 60 preprogrammed in accordance with the flow chart illustrated in FIG. 5.

Before describing the flow chart in detail it may be helpful to consider the general computational approach to be implemented. The dry cycle time versus outlet air temperature function represented graphically in FIG. 3 is not analytically defined but rather must be empirically defined by time-temperature coordinate pairs determined as the dry cycle progresses. In accordance with one form of the invention, the time-temperature coordinates are determined by detecting the occurrence of incremental increases in the outlet temperature of predetermined magnitude and recording the time of occurrence of each such incremental increase relative to the start of the dry cycle. Each detected incremental increase is of a constant predetermined magnitude $\Delta T$. This generates a plurality of time-temperature coordinates $(T_i, t_i)$. However, each temperature coordinate exceeds the immediately preceding temperature coordinate by $\Delta T$. Thus, to compute the integral values, only the $t_i$ coordinates need be retained. The integral of the empirically defined time-temperature function may then be approximated by the summation:

$$I = \sum_{i=1}^{f} t_i \Delta T$$

where $t_i$ represents the time relative to the start of the cycle at which the $i^{th}$ incremental increase in outlet temperature was detected.

As described hereinbefore, two values of this integral are of interest. A first integral value $I_1$ corresponding to the integral of the function over the temperature range from the initial temperature to the plateau temperature $T_p$ may be approximated by a summation:

$$I_1 = \sum_{i=1}^{p} t_i \Delta T$$

where $t_p$ represents the time of the first incremental increase to or above the plateau temperature. This value represents area A in FIG. 3. The second integral value of interest, $I_2$ representing the integral from the plateau temperature to the final temperature, may be approximated by the summation:

$$I_2 = \sum_{i=p+1}^{f} t_i \Delta T.$$

This value represents area B in FIG. 3.

The ratio of the integral value $I_2$ to the first integral value $I_1$ is then expressed as:

$$\frac{I_2}{I_1} = \frac{\sum_{i=p+1}^{f} t_i}{\sum_{i=1}^{p} t_i}.$$

It should be noted that this ratio is simply the ratio of two time summations, the $\Delta T$ factor common to both summations being cancelled. Since it is this ratio which is ultimately of interest, the $\Delta T$ factor can be deleted from the summations. Thus, the summation of the recorded times over the ranges of interest correspond to the values of the integral of the time-temperature function over the temperature range of interest. It will be apparent that the total summation I equals the sum of summations $I_1$ and $I_2$ and, consequently, $I_2$ can be determined by merely subtracting $I_1$ from I. Computation of the desired integral values can thus be implemented by summing the times $t_i$ from the detection of the initial incremental increase until the plateau temperature is sensed, storing this value as $I_1$, then continuing the time summation and repeatedly computing $I_2$ upon each detection of an incremental increase in temperature after the detection of the plateau temperature by simply subtracting $I_1$ from the total summation I until the ratio $(I_2/I_1)$ at least equals the predetermined reference value at which time termination of the dry cycle is initiated.

In implementing this control scheme, means must be provided to detect the plateau temperature $T_p$. As described hereinbefore, the plateau temperature $T_p$ is the temperature characterizing the constant moisture removal rate portion of the cycle. As shown in FIG. 3, the time-temperature curve is substantially vertical during this phase. Also, as shown in FIG. 3, the slope of the curve, $(\Delta t/\Delta T)$, increases to a maximum at the plateau temperature, then decreases thereafter. Ideally, the plateau temperature of interest corresponds to the inflection point of the time-temperature function. For an analytic function this point could be determined by determining the temperature at which the second derivative of the function equals zero. However, since the function of interest is empirically defined, the plateau temperature is approximated by detecting the maximum $\Delta t_i$. This is accomplished in accordance with a preferred form of the invention by preprogramming the microcontroller to compute the change in time, $\Delta t_i$, for the $i^{th}$ incremental change, $\Delta T$ in the outlet air temperature $T_o$ and compare each newly computed $\Delta t_i$ to the immediately preceding change in time $\Delta t_{i-1}$. When $\Delta t_i$ is less than the preceding change $\Delta t_{i-1}$, this signifies the transition from the constant moisture removal period into the decreasing moisture removal period. Thus, the plateau temperature $T_p$ is detected by detecting the transition from the constant moisture removal period to the decreasing moisture removal period. At this point, the computation of the first integral value over the range from the initial temperature to the plateau temperature representing area A (FIG. 3) is terminated and the computation of the second integral value over the second temperature range from the plateau temperature to the final or end point temperature corresponding to area B (FIG. 3) begins.

Figure 5:
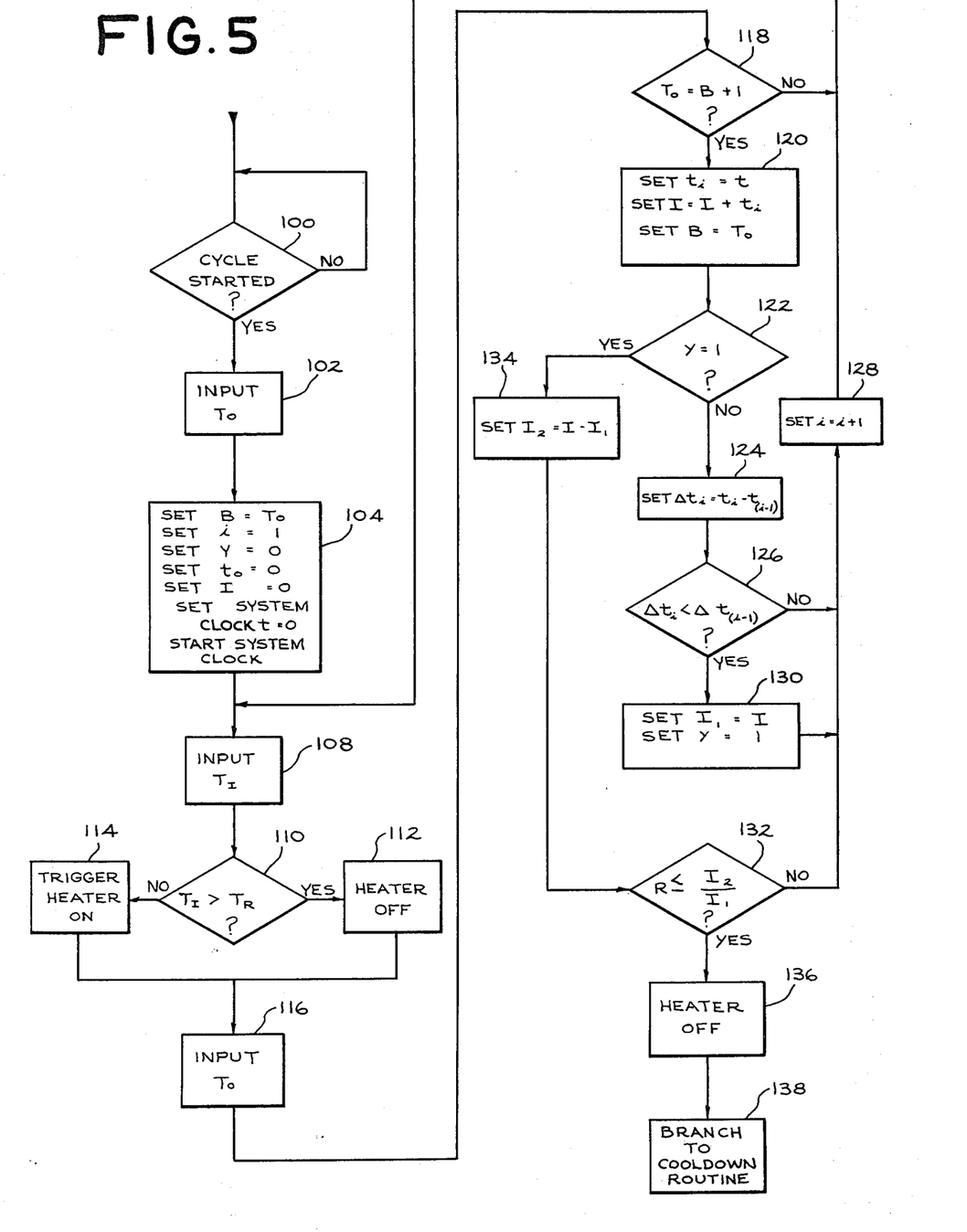
FIG. 5 is a program flow chart showing the manner in which the microcontroller of the control system of FIG. 4 can be programmed to illustratively embody the present invention.

Referring now to FIG. 5, the program flow chart for microcontroller 60 insofar as it is relevant to the control means of the present invention will now be considered. The program iterates the loop around Block 100 until the dry cycle is started by user actuation of ON/OFF switch 62, at which point the initial value of the drum outlet air temperature $T_0$ is input to microcontroller 60 from A/D converter 90 (FIG. 4) (Block 102). Temperature reference value B is initialized to the initial value of $T_0$, index i is set to one and flag Y and cycle time variable $t_i$, the summation variable I representing the summation of times $t_i$ and the system clock or timer t are all initialized to zero (Block 104).

Blocks 108, 110, 112 and 114 represent the portion of microcontroller 60 preprogrammed to maintain the inlet air temperature substantially constant. The inlet air temperature $T_I$ is input from thermistor 52 via A/D converter 90 (Block 108). Inquiry 110 compares $T_I$ to the desired reference temperature $T_R$. If $T_I$ exceeds $T_R$ no trigger signal is provided to switch heater control triac 80 into conduction (Block 112). If $T_I$ is less than or equal to $T_R$ then a trigger signal for triac 80 is generated (Block 114).

Next, outlet air temperature $T_o$ is input from thermistor 54 via A/D converter 90 (Block 116). The integral computation is accomplished by inquiry 118 and Block 120. Inquiry 118 looks for the incremental increase in outlet temperature by comparing the current temperature measurement $T_o$ with the reference B+1. The first time through the program for each cycle, B+1 represents an incremental increase of one degree over the initial value of $T_o$. Upon each detection of an incremental increase thereafter, B is updated to equal the $T_o$ representing that increase, so that B+1 always represents an incremental increase of one degree over the next preceding detected increase. The program returns to Block 108 to repeat the temperature measurements until $T_o$ equals B+1 signifying that an incremental increase has been detected. Upon detection of such an increase, the cycle time t is stored in memory as $t_i$, representing the cycle time of the occurrence of the $i^{th}$ detected incremental increase in outlet temperature; this value of $t_i$ is added to the summation variable I representing the summation:

$$I = \sum_{i=1}^{\ell} t_i$$

and reference variable B is updated to the current temperature measurement $T_o$ (Block 120).

The next portion of flow chart provides means for detecting the plateau temperature $T_p$. Flag y is initially zero and remains zero until the plateau temperature is detected. Thus, until the plateau temperature is sensed, $\Delta t_i$ is computed (Block 124) and inquiry 126 compares the newly computed $\Delta t_i$ to the next preceding value $\Delta t_{i-1}$. If $\Delta t_i$ is not less than $\Delta t_{i-1}$, i is incremented by 1 (Block 128), and the program returns once again to Block 108 to repeat the temperature measurements looking for the next incremental increase in outlet temperature. When $\Delta t_i$ is less than $\Delta t_{i-1}$ signifying detection of the plateau temperature, variable $I_1$, representing the first integral value is set equal to the current value of I, and flag y is set to one (Block 130). Thereafter, the summation of time coordinate $t_i$ represented by the variable I will be used to compute the second integral value over the range from the plateau temperature $T_p$ to the final or end point temperature $T_f$. The program then returns to Block 108 to repeat the temperature sensing steps.

On subsequent iterations after detection of $T_p$, flag y equals 1 and inquiry 122 bypasses the plateau temperature sensing portion of the program and computes the second value $I_2$ by simply subtracting $I_1$, which represents the area under the first portion of the curve from I which represents the total area under the curve (Block 132). Inquiry 134 compares the ratio of $I_2$ to $I_1$ to the reference value R; if not at least equal, the program returns to Block 108 to repeat the temperature sensing steps.

When the ratio $(I_2/I_1)$ at least equals reference R, termination of the dry cycle is initiated by inhibiting further trigger signals to triac 84 (Block 136) thereby preventing energization of heating elements 32 and 33 and either ending appliance operation or preferably branching to a cooldown routine which may provide for continued or periodic tumbling of the clothes without heat to minimize wrinkling (Block 138).

It will be apparent from the foregoing that the present invention provides a control system for clothes dryers which automatically initiates termination of the drying cycle when the clothes load attains the percentage dryness level selected by the user by detecting an end point which is a function of the integral of the dry cycle time-outlet air temperature characteristic function and which is derived from relative temperature measurements rather than absolute temperature measurements, thereby avoiding the need for relatively high accuracy sensing components.

While in accordance with the patent statutes, there has been described what at present is considered to be the preferred embodiment of the invention, it will be apparent to those skilled in the art that various changes and modifications may be made therein without departing from the invention. It is intended, therefore, by the appended claims to cover all such changes and modifications as fall within the true spirit and scope of the invention.

What is claimed is:

1. An automatic control system for a clothes dryer of the type having a clothes drying drum, an air flow system for passing drying air through the drum, a heater for heating the air at the inlet side of the drum, and selection means enabling the user to select a particular reference value representing the desired dryness level, and having a drying cycle having an initial warm-up period during which the outlet air temperature increases relatively rapidly from the initial temperature to a plateau temperature followed by a period of relatively constant rate of moisture removal during which the outlet air temperature remains relatively constant at the plateau temperature followed by a period of decreasing rate of moisture removal during which the temperature again increases relatively rapidly to the end point temperature, the control system comprising:

inlet air temperature sensing means for sensing the temperature of air entering the drum;
    outlet air temperature sensing means for sensing the temperature of air leaving the drum; and
    control means including:
    means responsive to said inlet air temperature sensing means for controlling the heater to maintain the inlet air temperature at a predetermined substantially constant temperature;
    clock means for measuring the elapsed time of the drying cycle designated the drying cycle time;
    means responsive to said outlet air temperature sensing means and said clock means for computing an end point value which is a function of the integral of the dry cycle time as a function of outlet air temperature; and
    means for initiating termination of the dry cycle when a predetermined relationship exists between said end point value and the predetermined reference value selected by the user.

2. The control system of claim 1 wherein said means for computing said end point value comprises means for computing a first value corresponding to the integral of dry cycle time over a first range of sensed outlet air temperatures and a second value corresponding to the integral of dry cycle time over a second range of sensed outlet air temperatures and means for computing the ratio of said second value to said first value and wherein said end point value equals said ratio.

3. The control system of claim 2 wherein said outlet temperature varies over a range extending between a relatively low initial temperature and a relatively high final temperature and including the plateau temperature, and wherein said first temperature range extends from the initial temperature to the plateau temperature and the second range extends from the plateau temperature to the final temperature.

4. The control system of claim 3 wherein said predetermined relationship exists whenever said ratio at least equals said predetermined reference value.

5. An automatic control system for a clothes dryer of the type having a clothes drum, an air flow system for passing drying air through the drum, a heater for heating the air at the inlet side of the drum, and selection means enabling the user to select a reference value representing a particular dryness level, the drying cycle having an initial warm-up period characterized by relatively rapidly increasing drum outlet air temperature, followed by a period of relatively constant moisture removal characterized by a relatively constant drum outlet air plateau temperature, followed by a period of decreasing moisture removal characterized by relatively rapidly increasing outlet air temperature, the control system comprising:

inlet air temperature sensing means for sensing the temperature of air entering the drum;
    outlet air temperature sensing means for sensing the temperature of air leaving the drum; and
    control means including:
    means responsive to said inlet air temperature sensing means for controlling the heater means to maintain the inlet air temperature at a predetermined substantially constant temperature;
    clock means for timing the drying cycle;
    means responsive to said outlet air temperature sensing means and said clock means for integrating the drying cycle time as a function of outlet air temperature, operative to compute a first value representing the integral of time as a function of temperature over a first outlet air temperature range and to compute a second value representing the integral of time as a function of temperature over a second outlet air temperature range;
    means for computing the ratio of said second value to said first value;
    means for comparing said ratio to the predetermined reference selected by the user; and
    means for initiating termination of the drying cycle when said ratio at least equals said reference.

6. The control system of claim 5 wherein said outlet temperature varies over a range extending between a relatively low initial temperature and a relatively high final temperature and including therebetween the plateau temperature, and wherein said first temperature range extends from the initial temperature to the plateau temperature and the second range extends from the plateau temperature to the final temperature.

7. The control system of claim 6 wherein said means for integrating dry cycle time as a function of outlet temperature comprises:

means for detecting incremental changes of predetermined magnitude in outlet temperature;

means for marking the occurrence of said incremental temperature changes in time operative to generate a plurality of temperature-time coordinates, $(T_i, t_i)$, wherein $t_i$ represents the cycle time and $T_i$ represents the outlet air temperature for the $i^{th}$ detected incremental temperature change; said coordinates defining the characteristic time-temperature function of the outlet temperature;

means for detecting the plateau temperature;

and means for computing the integral of the function defined by said temperature time coordinate pairs.

8. The control system of claim 7 wherein said means for detecting said plateau temperature comprises means for computing the difference $(t_1 - t_{i-1})$ between the time $t_i$ of the last detected incremental increase in outlet air temperature and the next preceding increase $t_{i-1}$; and comparing this difference to the next preceding similarly computed difference, $(t_{i-1} - t_{i-2})$; and means for determining when the condition $(t_i - t_{i-1}) \leq (t_{i-1} - t_{i-2})$ is satisfied, signifying the detection of the plateau temperature.

9. A method for controlling the duration of the drying cycle for a clothes dryer of the type having a clothes drum; an airflow system for passing drying air through the drum, a heater for heating the air at the inlet side of the drum; means for sensing the inlet temperature of air entering the drum, means for sensing the outlet temperature of air leaving the drum, means responsive to the inlet air temperature sensing means for maintaining an essentially constant inlet air temperature and selection means enabling the user to select a desired dryness level from a plurality of dryness levels, the drying cycle having an initial warm-up period characterized by a relatively rapid increase in the outlet temperature; followed by a period of relatively constant moisture removal characterized by a relatively constant outlet temperature designated the plateau temperature, followed by a period of decreasing moisture removal characterized by an increasing outlet temperature, said method comprising the steps of:

sensing the outlet air temperature;

marking in time the occurrence of predetermined incremental increases in outlet air temperature;

computing a first value corresponding to the integral of dry cycle time as a function of outlet air temperature as the temperature varies from the initial temperature to the plateau temperature;

computing a second value corresponding to the integral of dry cycle time as a function of outlet air temperature as the temperature varies from the plateau temperature to the last measured temperature;

computing the ratio of the second value to the first value;

comparing the ratio to a predetermined reference corresponding to the dryness level option selected by the user; and initiating termination of the dry cycle when a predetermined relationship between the ratio and the reference is satisfied.

10. A method for controlling the duration of the drying cycle for a clothes dryer of the type having a clothes drum; an airflow system for passing drying air through the drum, a heater for heating the air at the inlet side of the drum; means for sensing the inlet temperature of air entering the drum, means for sensing the outlet temperature of air leaving the drum, means responsive to the inlet air temperature sensing means for maintaining an essentially constant inlet air temperature and selection means enabling the user to select a desired dryness level from a plurality of dryness levels, the drying cycle having an initial warm-up period characterized by a relatively rapid increase in the outlet temperature; followed by a period of relatively constant moisture removal characterized by a relatively constant outlet temperature designated the plateau temperature; followed by a period of decreasing moisture removal characterized by an increasing outlet air temperature, said method comprising the steps of:

detecting incremental changes in outlet air temperature;

marking the cycle time of each such occurrence and generating a plurality of time-temperature coordinate pairs, $(T_i, t_i)$ representing the pair corresponding to the $i^{th}$ incremental change in temperature;

detecting the plateau temperature;

computing a first value representing the integral of the time vs outlet air temperature function defined by the coordinate pairs over the temperature range from the initial temperature to the plateau temperature;

thereafter periodically computing a second value representing the integral of the time versus outlet air temperature function over the temperature range from the plateau temperature to the last marked temperature coordinate;

computing the ratio of the second value to the first value;

comparing the ratio to a predetermined reference representing the dryness level selected by the user; and initiating termination of the dry cycle when the ratio at least equals the reference.

11. The method of claim 10 wherein the step of detecting the plateau temperature comprises the steps of subtracting each newly marked time coordinate, $t_1$, from the next preceding time coordinate, $t_{i-1}$, comparing this difference to the next preceding similarly computed difference $t_{i-1} - t_{i-2}$ until the condition $(t_i - t_{i-1}) \leq (t_{i-1} - t_{i-2})$ is satisfied, signifying the detection of the plateau temperature.

* * * * *